(12) United States Patent
Buchanan, Jr.

(10) Patent No.: US 6,912,727 B2
(45) Date of Patent: Jul. 5, 2005

(54) HEAD HARNESS FOR NIGHT VISION DEVICE

(75) Inventor: Harrison L. Buchanan, Jr., Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/748,616

(22) Filed: Dec. 30, 2003

(65) Prior Publication Data

US 2004/0156113 A1 Aug. 12, 2004

Related U.S. Application Data

(60) Provisional application No. 60/438,027, filed on Jan. 3, 2003.

(51) Int. Cl.[7] ............................... F41H 1/04
(52) U.S. Cl. .................. 2/6.2; 2/6.3; 2/414; 2/452; 224/181; 359/409
(58) Field of Search ................. 2/173, 421, 422, 2/206, 909, 6.2, 6.3, 6.6, 6.7, 420, 9, 414, 415, 452; 128/207.11; 224/181, 930; 359/409, 815

(56) References Cited

U.S. PATENT DOCUMENTS

| | | | | |
|---|---|---|---|---|
| 553,146 A | * | 1/1896 | Aitchison | 359/409 |
| 1,356,708 A | * | 10/1920 | Goodyear | 351/156 |
| 1,706,601 A | * | 3/1929 | Drager et al. | 128/207.11 |
| 2,039,234 A | * | 4/1936 | Malcom | 128/206.23 |
| 2,270,238 A | * | 1/1942 | Clarke et al. | 2/6.2 |
| 2,375,147 A | * | 5/1945 | Teague | 128/207.11 |
| 2,418,376 A | * | 4/1947 | Turner | 2/9 |
| 2,784,713 A | * | 3/1957 | Green | 2/206 |
| 3,843,970 A | * | 10/1974 | Marietta et al. | 2/415 |
| 4,457,461 A | * | 7/1984 | Docking et al. | 224/181 |
| 4,741,054 A | * | 5/1988 | Mattes | 2/421 |
| 4,753,378 A | | 6/1988 | Kastendieck et al. | |
| 4,766,610 A | * | 8/1988 | Mattes | 2/414 |
| 4,843,229 A | | 6/1989 | Reed et al. | |
| 5,179,735 A | * | 1/1993 | Thomanek | 2/422 |
| 5,307,204 A | * | 4/1994 | Dor | 359/400 |
| 5,339,464 A | * | 8/1994 | Dor | 2/6.2 |
| 5,469,578 A | * | 11/1995 | Mattes | 2/6.7 |
| 5,471,678 A | * | 12/1995 | Dor | 2/6.7 |
| 5,786,932 A | * | 7/1998 | Pniel | 359/409 |
| 5,914,816 A | | 6/1999 | Soto et al. | |
| 5,996,126 A | * | 12/1999 | Barthold et al. | 2/414 |
| 6,701,535 B2 | * | 3/2004 | Dobbie et al. | 2/422 |
| 2002/0129818 A1 | * | 9/2002 | Morgan et al. | 128/206.26 |

* cited by examiner

Primary Examiner—Rodney M. Lindsey
(74) Attorney, Agent, or Firm—RatnerPrestia (57) ABSTRACT

A head harness for supporting a night vision device is provided. The head harness includes a frame assembly and padding coupled to the frame assembly. The padding is configured to contact at least one of a forehead and a cheek of the face of a user of the head harness.

27 Claims, 6 Drawing Sheets

HEAD HARNESS FOR NIGHT VISION DEVICE

This application is related to and claims the benefit of U.S. Provisional Application No. 60/438,027 entitled Head Harness for Night Vision Goggles filed on Jan. 3, 2003.

FIELD OF THE INVENTION

The present invention relates, in general, to a head harness, and more specifically, to a head harness for supporting a night vision device.

BACKGROUND OF THE INVENTION

In certain night vision applications, it is desirable to utilize a head harness to support the night vision device, rather than a helmet mounted system. Unfortunately, conventional head harnesses typically do not provide the comfort or stability that is desired for various night vision operations. For example, when worn for extended periods of time, certain head harnesses cause pain with respect to various areas of a user's head. Further, certain head harnesses do not hold the night vision device in the proper position during certain physical operations such as running, jumping, crawling, and rolling.

Another problem with certain conventional night vision supporting head harnesses is that they do not provide for proper positioning adjustments of the night vision device. For example, the user may not be able to properly position the night vision device in front of his/her eyes. The ability to properly position the night vision device is important to utilize the full benefit of the field-of-view and the eye relief features of the night vision device.

Yet another problem with conventional head harnesses is that they do not provide for the head harness assembly to be compacted for storage.

Further, conventional head harnesses typically do not provide a mechanism allowing the user to quickly remove the head harness from their head. Further still, conventional head harnesses do not offer the user multiple mounting configurations.

Thus, it would be desirable to provide a head harness for supporting a night vision device that overcomes one or more of the above-recited deficiencies.

SUMMARY OF THE INVENTION

In an exemplary embodiment of the present invention, a head harness for supporting a night vision device is provided. The head harness includes a frame assembly and padding coupled to the frame assembly. The padding is configured to contact at least one of a forehead and a cheek of the face of a user of the head harness.

In another exemplary embodiment of the present invention, another head harness for supporting a night vision device is provided. The head harness includes a frame assembly including a plurality of frame members. The head harness also includes at least one hinge providing hinged interconnection between the plurality of frame members such that the head harness may be compacted through operation of the hinged interconnection.

In yet another exemplary embodiment of the present invention, another head harness for supporting a night vision device is provided. The head harness includes a frame assembly and a pad assembly coupled to the frame assembly. The pad assembly is configured to contact a lower rear portion of a user's head when the user wears the head harness. The pad assembly includes a netting material.

In yet another exemplary embodiment of the present invention, another head harness for supporting a night vision device is provided. The head harness includes a frame assembly and a plurality of straps configured to be coupled to the frame assembly using snap fasteners. The straps are adjustable by a user of the head harness.

In yet another exemplary embodiment of the present invention, another head harness for supporting a night vision device is provided. The head harness includes a frame assembly and a protective pad coupled to the frame assembly. The protective pad is positioned to protect a user's head from contact with the night vision device or a night vision device mount coupled to the frame assembly upon the night vision device being pivoted is from a first position in front of the user's line of sight to a second position above a user's head.

In yet another exemplary embodiment of the present invention, another head harness for supporting a night vision device is provided. The head harness includes a frame assembly and a mounting assembly coupled to the frame assembly for mounting a night vision device to the frame assembly. The frame assembly is curved inward from a center portion towards two ends portions such that when a user wears the head harness, the inwardly curved end portions extend toward a face of the user.

BRIEF DESCRIPTION OF THE DRAWINGS

Exemplary embodiments of the invention will be described with reference to the drawings, of which.

DETAILED DESCRIPTION OF THE INVENTION

Preferred features of selected embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the configurations and materials described hereafter can be modified within the scope of this invention.

As explained herein with reference to the figures, according to various exemplary embodiments of the present invention, a head harness is provided with improved comfort and stability. These improvements are provided, for example, through the shape and padding of a facemask frame assembly, as well as through the inclusion of a neck pad and adjustable straps. Such a design also provides improved stability to the night vision device during certain operations, for example, during quick movements. In certain embodiments, one or more of the adjustable straps incorporates a quick-release buckle for rapid removal. The adjustable straps may be configured in multiple mounting configurations such that the use of a chincup is optional. A mounting assembly provided to support a night vision device allows a user the ability to properly position the night vision device in front of their eyes. A flip-up/flip-down mechanism may also be incorporated to provide the user with the ability to move the night vision device into a stowed position when it is desired to remove the night vision device from the user's line-of-sight.

Figure 1:
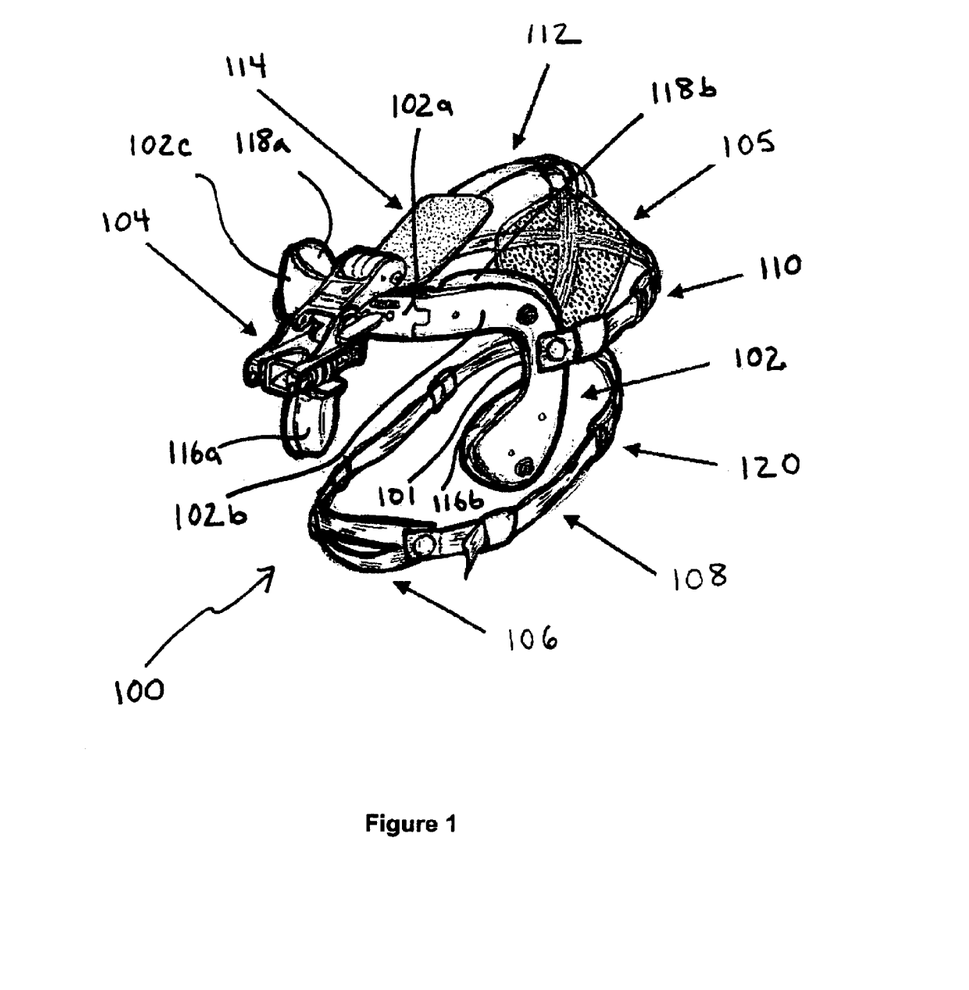
FIG. 1 is a perspective view of a head harness in accordance with an exemplary embodiment of the present invention.

FIG. 1 illustrates an exemplary head harness 100 equipped for supporting a night vision device (e.g., night vision goggles). Head harness 100 provides improved comfort and stability to the user. Head harness 100 is also designed to provide sufficient night vision device positioning adjustments to allow the user to properly align the optical axis of the night vision device to his/her line-of-sight for optimal viewing.

Head harness 100 includes frame assembly 102 which serves as the foundation for the remaining components of head harness 100. Head harness 100 is designed to properly fit the differing anthropometric shapes of a wide range of human heads, for example, from the $5^{th}$ to $95^{th}$ percentile human head. The curvatures of frame assembly 102 fit the human face in a manner which minimizes discomfort by avoiding sensitive areas of the face and spreading the load area over sufficient surface area.

Frame assembly 102 is curved in a number of directions to provide this improved comfort and stability. For example, frame assembly 102 is curved inward (i.e., towards the page) from center portion 102a towards two end portions 102b and 102c such that when a user wears the head harness, the inwardly curved end portions 102b and 102c extend toward a face of the user. Further, frame assembly 102 is curved downward (i.e., towards the bottom of the page) from center portion 102a towards end portions 102b and 102c.

Padding is coupled to frame assembly 102 to provide improved comfort during contact with the human face. For example, forehead pads 118a and 118b (shown in FIG. 6a) are provided to contact the forehead of the user. An additional forehead pad (not visible in FIG. 1 and shown as 118c in FIG. 6a) may be provided between forehead pads 118a and 118b. Thus, the forehead padding may be provided by any of a number of pads. Likewise, cheek pads 116a and 116b are provided to contact the cheeks of the user (shown in FIG. 6b). This system accommodates varying facial features and helps to mold frame assembly 102 and the padding system to the user's face for comfort during extended wear. Such padding may be coupled to frame assembly 102 using snap fasteners 500 to provide a robust means of retaining the padding to frame assembly 102 as well as an easy method of removing the padding from frame assembly 102 (e.g., for cleaning, replacement of worn pads, etc.).

Figure 6A:
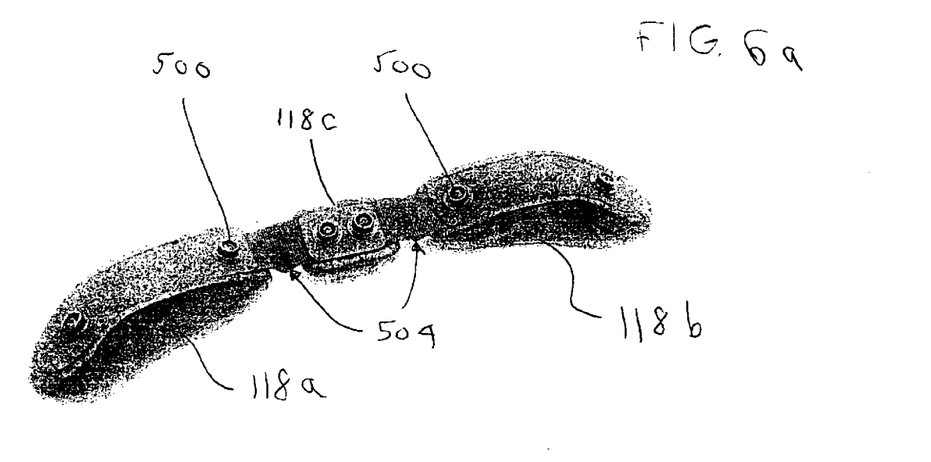
FIGS. 6a and 6b are perspective views of pads that are attachable to the frame assembly illustrated in FIG. 1.
Figure 6B:
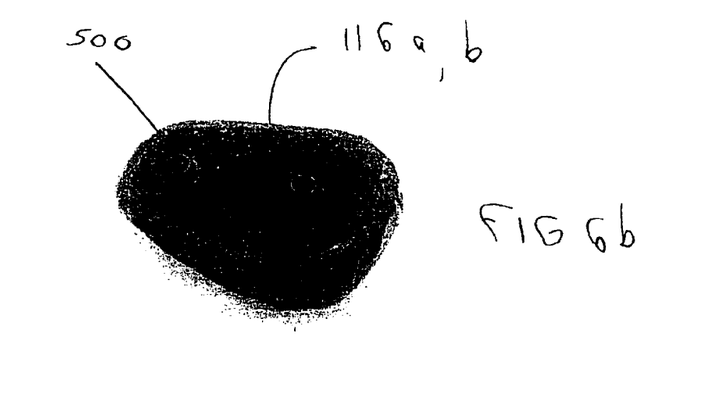

This padding may be constructed of any of a number of suitable materials. For example, the pads may include a sheepskin leather exterior provided around an interior that includes a soft material such as foam or air pockets. Further, the padding (e.g., the forehead padding) may include a number of pads that are coupled together (e.g., 3 pads connected together by a webbing material 504, as shown in FIG. 6a). Such coupling or linking of the pads helps to ensure that an individual pad does not get separated from the rest of the padding system (i.e., to prevent an individual pad from becoming lost). Further, by providing the padding using a plurality of pads, a single pad may be replaced as needed, as opposed to a complete padding assembly.

Head harness 100 may be used in conjunction with eyewear worn by a user. For example, the user may use eyeglasses or protective eyewear. Head harness 100 illustrated in FIG. 1 defines opening 101 (only one opening 101 is labeled in FIG. 1 between forehead pad 118b and cheek pad 116b; however, a second opening 101 is defined between forehead pad 118a and cheek pad 116a). Opening 101 is provided to receive a portion of eyewear (e.g., eyeglass stems, arms, or straps) worn by a user of head harness 100, thereby allowing the stems, arms, or straps to pass between frame assembly 102 and the user's face.

Referring again to FIG. 1, head harness 100 also includes mounting assembly 104 coupled to center portion 102a of frame assembly 102 for mounting a night vision device to head harness 100. Various detailed features of mounting assembly 104 are explained below primarily by reference to FIG. 3.

Head harness 100 also includes neck pad assembly 105 (i.e., nape pad assembly 105) coupled to frame assembly 102 via adjustable straps. Neck pad assembly 105 serves as an anchor point for head harness 100 after a night vision device is installed on mounting assembly 104. Neck pad assembly 105 is designed for comfort and stability, and as such, it grips the lower rear portion of the user's head providing stability to frame assembly 102 and to the night vision device during operations such as running, jumping, and crawling. Neck pad assembly 105 is designed to fit the differing anthropometric shapes of various human heads, for example, from the $5^{th}$ to $95^{th}$ percentile human head.

As shown in FIG. 1, five adjustment straps connect into neck pad assembly 105. More specifically, upper center strap 112 couples neck pad assembly 105 to center portion 102a of frame assembly 102. Further, each of two upper side straps 110 (only one of which is labeled in FIG. 1) couples neck pad assembly 105 to a respective one of end portions 102b and 102c of frame assembly 102. Further still, each of two lower side straps 108 (only one of which is labeled in FIG. 1) may be used to couple neck pad assembly 105 to a respective one of end portions 102b and 102c of frame assembly 102 (See the embodiment illustrated in FIG. 5). Although five adjustment straps are illustrated in FIG. 1, alternative combinations of straps could provide the desired interconnection of the head harness components.

The materials used in neck pad assembly 105 are desirably selected for strength and breathability, thereby maximizing ruggedness while providing comfort to the user during periods of extended operation. According to an exemplary embodiment of the present invention, the materials used in neck pad assembly 105 includes a military grade netting material.

Each of the five adjustment straps (i.e., upper center strap 112, two upper side straps 110, and two lower side straps 108) is desirably adjustable and may be tightened, for example, by pulling the end of a respective adjusting strap towards the front of the head. This provides an easy method of tightening the straps to the user. In an exemplary embodiment of the present invention, one or more of the adjusting straps, for example the lower left side strap 108, may incorporate a quick-release buckle 120 enabling the user to quickly remove head harness 100 if desired. This also enables the user to quickly don head harness 100 if the adjustment straps have been previously fit to his/her head. By incorporating the lower left side strap 108 to include quick-release buckle 120, right handed users are provided with a particularly easy system for removing and donning head harness 100.

Each adjustment strap may incorporate a plastic self-locking buckle selected for their ease of use and low profile shape. Each buckle allows the adjustment strap to easily be pulled for tightening and then holds the respective strap in position until the user pulls out on the buckle. The low profile shape of the buckles help to prevent inadvertent release of the straps by external items encountered by the user such as underbrush and cables.

Referring again to FIG. 1, head harness 100 also includes chincup 106 coupled to the remainder of head harness 100 via lower side straps 108. In the exemplary embodiment illustrated in FIG. 1, chincup 106 is an open design that positions the user's chin between the two straps and securely holds chincup 106 in position during operation. Chincup 106 desirably incorporates a soft surface (e.g., sheepskin leather) for contact with the user's skin.

Head harness 100 also includes protective pad 114 to protect the user's head from injury if mounting assembly 104 (or an installed night vision device) rotates past the stowed position and comes in contact with the top of the head while the user is wearing head harness 100. Mounting assembly 104 may be designed to allow for rotation past the stowed position to configure head harness 100 for compact storage; however, injury could occur to the user's head if mounting assembly 104 was allowed to strike the top of the head during maneuvers. Protective pad 114 may incorporate a hard composite material (e.g., a hard plastic) which distributes any applied force over a broad area and substantially eliminates the possibility of point impact to the user's head. Protective pad 114 desirably incorporates a soft yet durable surface (e.g., sheepskin leather) on the underside next to the user's head for comfort.

Figure 2:
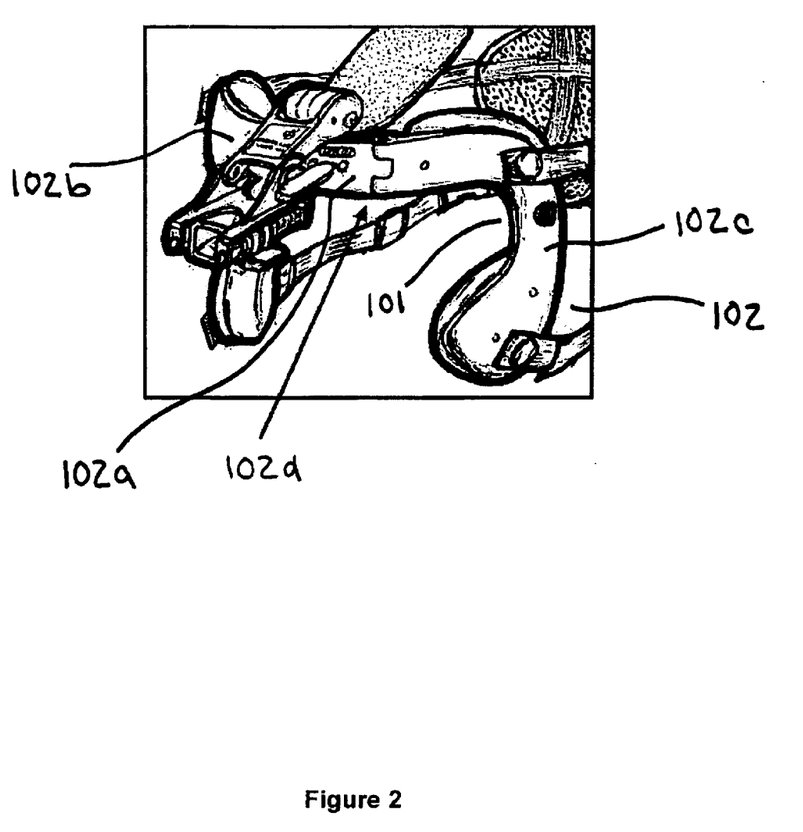
FIG. 2 is a detail of a portion of the head harness illustrated in FIG. 1.

FIG. 2 is a partial perspective view of head harness 100. As shown in FIG. 2, frame assembly 102 incorporates two hinges 102d (only one hinge 102d is visible in FIG. 2). Hinges 102d provide hinged interconnection between center portion 102a of frame assembly 102 and each of the two end portions 102b and 102c. This hinged interconnection allows frame assembly 102 to be folded into a compact shape for storage (e.g., in a carrying case). The ability to fold head harness 102 into a compact shape helps to minimize the bulk of equipment the user carries. Further, head harness 100 is less susceptible to damage during storage in a compact case.

The hinged interconnection provided between center portion 102a of frame assembly 102 and each of the two end portions 102b and 102c may be provided in a single direction (i.e., inward or outward). In an alternative embodiment of the present invention, the hinged interconnection provides for pivoting head harness 100 in either direction.

Figure 3:
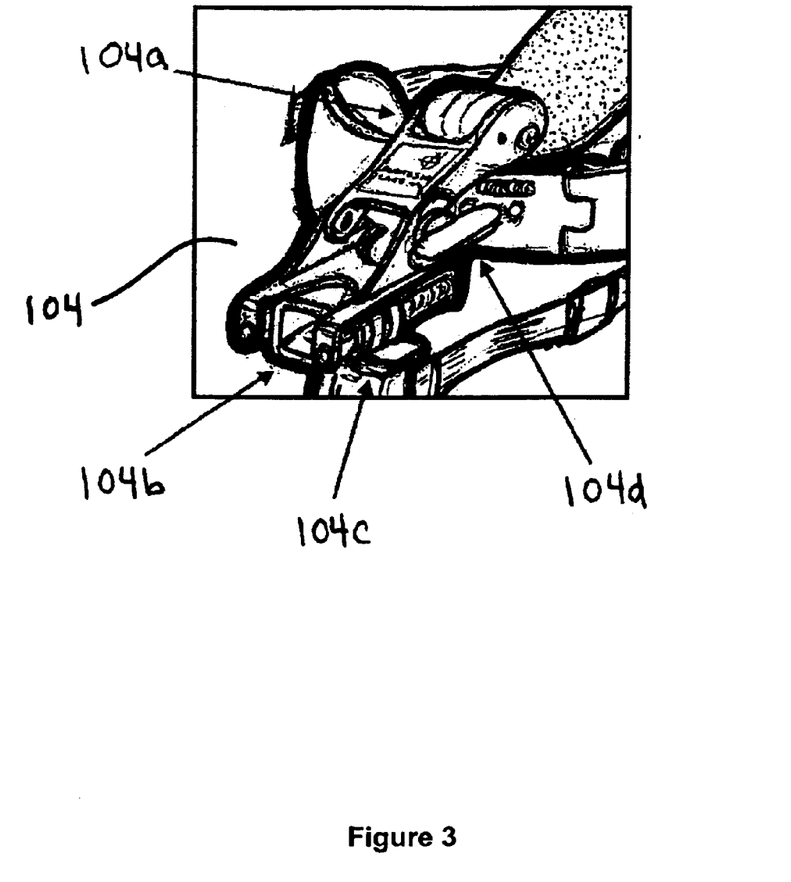
FIG. 3 is another detail of a portion of the head harness illustrated in FIG. 1.

Mounting assembly 104 is shown in greater detail in FIG. 3. Mounting assembly 104 may be configured to provide the functions of night vision device mounting, fore/aft adjustment (i.e., away from face and towards face), line-of-sight tilt adjustment, and flip-up/flip-down. It may also incorporate a magnet module participating in the function which turns the night vision device off if the night vision device is removed from mounting assembly 104 or if the night vision device is flipped-up to the stowed position. Such a magnet module may also participate in the function of automatically turning the night vision device on if it is flipped-down to its active use position. Further, the mechanisms used in the line-of-sight tilt mechanism may use different cam shapes than conventional mechanisms, thereby providing a different rotational angle. Various functions of mounting assemblies are disclosed in U.S. Pat. No. 5,914,816, which is hereby incorporated by reference for its teachings with respect to night vision systems.

Referring again to FIG. 3, mounting assembly 104 includes night vision device mounting interface 104b, which may be spring loaded to allow for insertion of varying sizes of mounting horns into night vision device mounting interface 104b, thereby providing a secure and quiet fit between the two interfacing parts. Fore/aft mechanism 104c may be a rack and pin design providing multiple locking positions, and further may be designed for single hand use (e.g., the left hand). Flip-up/flip-down mechanism 104a allows the user to move the night vision device into a stowed position when it is not desired to have the night vision device in the user's field-of-view. Flip-up/flip-down mechanism 104a desirably does not require a button or lever for activation from either the flipped-up or flipped-down position to the opposite position. The user must simply overcome the force holding the mechanism in place and then move mounting assembly 104 into the opposite position. Line-of-sight tilt mechanism 104d is also designed for single hand use (e.g., the left hand). Line-of-sight tilt mechanism 104d works through the action of a cam to vary the angle between two of the major supporting components of mounting assembly 104. The magnet module (not shown in FIG. 3) incorporates a cylindrical magnet that travels through a magnet cavity as gravity pulls the magnet in one direction or the other.

Figure 4:
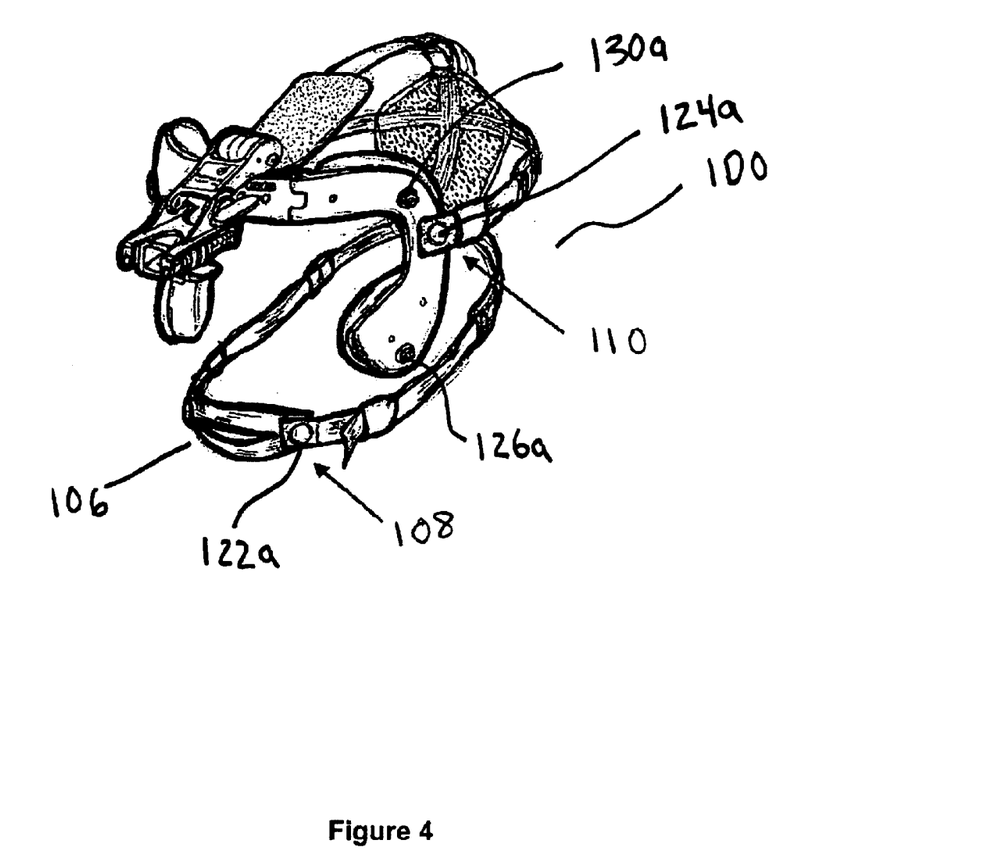
FIG. 4 is a perspective view of a head harness including a chincup in accordance with an exemplary embodiment of the present invention.
Figure 5:
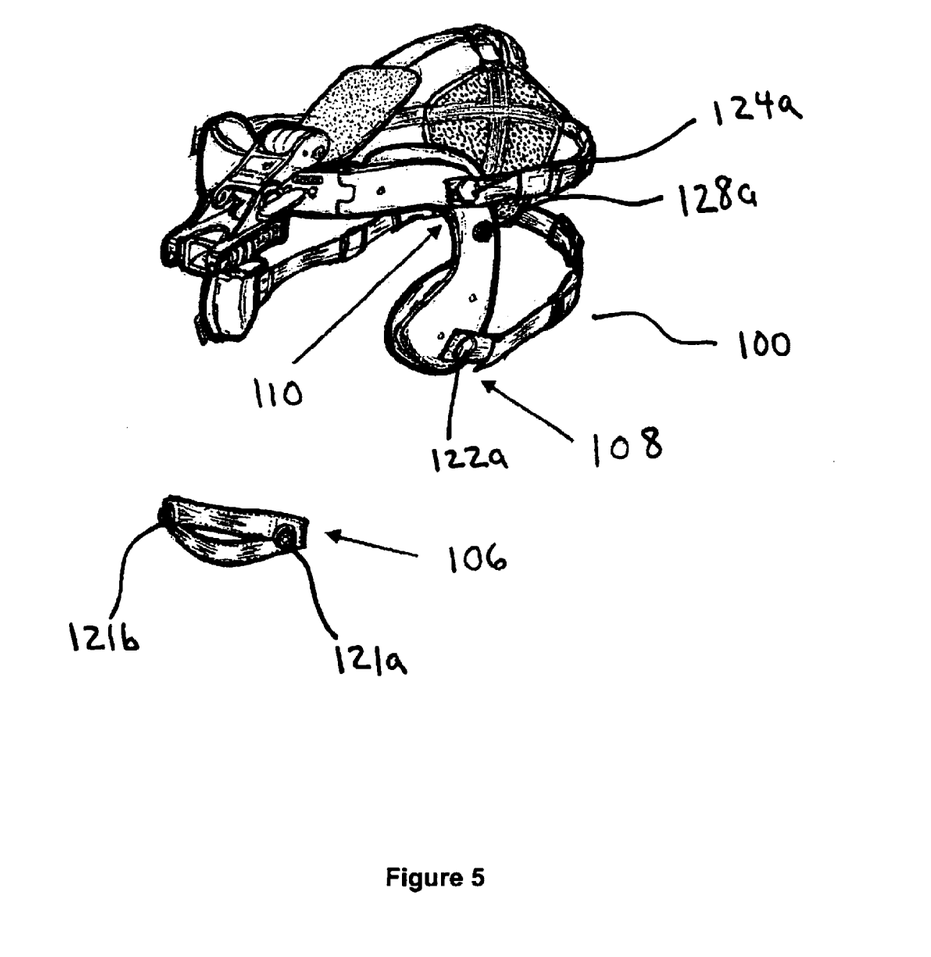
FIG. 5 is a perspective view of the head harness of FIG. 4 with the chincup removed in accordance with an exemplary embodiment of the present invention.

The adjustment straps of head harness 100 illustrated in FIG. 1 can be used in various configurations, including those illustrated in FIGS. 4 and FIG. 5. The configuration illustrated in FIG. 4 includes chincup 106, while the configuration illustrated in FIG. 5 does not include chincup 106. These alternate configurations give the user the opportunity to choose which configuration they prefer. Typical user's preferences vary depending on the user's facial profile, their personal history with night vision device equipment, and/or their operational missions.

As shown in FIGS. 4–5 lower side strap 108 includes first mating portion 122a of a snap fastener,(e.g., a female mating portion). Likewise, upper side strap 110 includes first mating portion 124a of a snap fastener. Although not visible in FIGS. 4–5, the opposite lower and upper side straps include similar first mating portions 122b and 124b of a snap fastener. Each of these first mating portions is configured to be engaged with a second mating portion of a snap fastener (e.g., a male mating portion). As shown in FIGS. 1 and 4–5, end portion 102b of frame assembly 102 includes second mating portions 126a, 128a, and 130a of respective snap fasteners. Likewise, the end portion 102c includes second mating portions 126b, 128b, and 130b of respective snap fasteners, not visible in FIGS. 4–5. Further, chincup 106 includes second mating portions 121a and 121b. Naturally, the portion of the head harness including the male or female portion of the snap fasteners may be reversed from that shown in the Figures.

In the configuration illustrated in FIG. 4, first mating portion 124a of upper side strap 110 is attached to the middle snap location on frame assembly 102 (i.e., second mating portion 128a) and first mating portion 122a of lower side strap 108 is attached to second mating portion 121a of chincup 106 (second mating portion 121a of chincup 106 is visible in FIG. 5, not FIG. 4). This leaves second mating portions 130a and 126a of end portion 102b on frame assembly 102 unused.

Chincup 106 is preferably designed so that it cannot be assembled backwards or upside-down. This is accomplished by making the shape of chincup 106 symmetric both vertically and horizontally. In such an embodiment, if lower side straps 108 are not twisted, the potential for wearing chincup 106 backwards is substantially eliminated. As provided above, chincup 106 may incorporate a soft yet durable material (e.g., sheepskin leather) to contact the user's skin to provide comfort during extended use.

In the configuration illustrated in FIG. 5, first mating portion 124a of upper side strap 110 (and the respective opposite mating portion on the opposite upper side strap that is not visible in FIG. 5) is attached to second mating portion 130a on end portion 102b of frame assembly 102. First mating portion 122a of lower side strap 108 (and the respective opposite mating portion on the opposite lower side strap that is not visible in FIG. 5) is attached to second mating portion 126a on end portion 102b of frame assembly 102. This leaves second mating portion 128a on end portion 102b of frame assembly 102 unused. Likewise, in the configuration illustrated in FIG. 5, chincup 106 is not used.

The head harness of the present invention may be used in any situation where a night vision device or other viewing device needs to be mounted on a user's head providing hands-free operation of the optical device.

In an exemplary embodiment of the present invention, the head harness is compatible to support a number of night vision device systems, for example, the AN/PVS-7 or the AN/PVS-14.

Although the present invention has primarily been described with respect to head harnesses for supporting night vision devices, it is not limited thereto. For example, the head harnesses disclosed herein may be utilized to support various devices, for example, alternative viewing devices, thermal viewing devices, conventional lighting systems, lasers, or any of a number of head mounted devices.

Although the materials utilized to contact the skin of the user (e.g., forehead padding, cheek padding, interior of nape pad, interior of protective pad, chincup, etc.) have primarily been described with respect to sheepskin leather, it is not limited thereto. For example, other materials suitable for the application may be selected. Such materials may desirably be durable, soft, breathable, etc.

Although the present invention has primarily been described with respect to connecting the adjustable straps to the frame assembly (and the chincup) using snap fasteners, and connecting the pads to the frame assembly using snap fasteners, it is not limited thereto. Any of a number of attachment mechanisms may be used that provides for a robust connection while allowing for simple removal and repeated use.

Although the present invention has primarily been described with respect to utilizing hinges for providing a hinged interconnection between the various portion of the frame assembly, it is not limited thereto. Any of a number of devices may be used to provide this interconnection so long as the frame assembly is at least partially collapsible and compacted in volume.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A head harness for supporting a night vision device, said head harness comprising:
   a frame assembly;
   padding coupled to said frame assembly, said padding being configured to contact at least one of a forehead and a cheek of the face of a user of the head harness;
   the frame assembly including three frame members comprising a center member and two end members; and
   two hinges providing hinged interconnections between said three frame members such that the head harness may be compacted through operation of the hinged interconnections; and
   the center member and the two end members providing a continuously curved surface to the frame assembly for fitting against the head of the user.

2. The head harness of claim 1 wherein said padding is coupled to said frame assembly using at least one snap fastener.

3. The head harness of claim 1 wherein said padding includes sheepskin leather provided around an interior including foam.

4. The head harness of claim 1 wherein said padding includes a plurality of pads coupled together.

5. The head harness of claim 4 wherein said pads are coupled together by a webbing material.

6. The head harness of claim 1 wherein said padding includes forehead padding and cheek padding separated by an opening positioned for receiving a portion of eyewear worn by the user of the head harness.

7. The head harness of claim 1 wherein
   the padding is positioned to protect the user's head from contact with a night vision device or a night vision device mount coupled to the frame assembly upon the night vision device being pivoted from a first position in front of the user's line of sight to a second position above the user's head.

8. The head harness of claim 7 wherein said padding includes a solid composite material.

9. The head harness of claim 1 wherein the center member includes a mounting assembly for mounting a night vision system to said frame assembly.

10. The head harness of claim 1 wherein the padding is coupled to at least one of said center member and said end members such that said padding contacts the face of the user when the user wears the head harness.

11. The head harness of claim 1 wherein a pad assembly is coupled to said center member via at least one strap, and is configured to contact a lower rear portion of the user's head when the user wears the head harness, said pad assembly including a netting material.

12. The head harness of claim 1 comprising:
   a plurality of straps configured to be coupled to said frame assembly using snap fasteners, said straps being adjustable by the user of the head harness.

13. The head harness of claim 12 wherein said plurality of straps includes a vertical strap for extending over the user's head, an upper side strap configured to be coupled to the two end members of said frame assembly, and a lower side strap configured to be coupled to said two end members of said frame assembly.

14. The head harness of claim 13 wherein a first mating portion of a snap fastener of at least one of said upper and said lower side straps are configured to be coupled to one of a plurality of second mating portions of the snap fastener on said frame assembly such that a position of said at least one of said upper and said lower side straps is adjustable.

15. The head harness of claim 13 wherein said lower strap is configured to be coupled to either of said frame assembly or a chincup assembly.

16. The head harness of claim 15 wherein said chincup assembly includes a sheepskin leather covering for contacting the skin of the user.

17. The head harness of claim 15 wherein said chincup assembly is symmetric about at least one of a vertical and a horizontal axis.

18. The head harness of claim 12 wherein each of said straps includes a self locking buckle mechanism for locking a position of each of said straps upon adjustment by the user.

19. The head harness of claim 12 wherein at least one of said straps includes a quick release mechanism such that the head harness is configured to be loosened for removal upon the user operating the quick release mechanism.

20. The head harness of claim 19 wherein said quick release mechanism is included on a left side of said lower side strap.

21. The head harness of claim 12 wherein at least one of said straps includes a first mating portion of a snap fastener, said frame assembly including a plurality of second mating portions of the snap fastener, said first mating portion being configured to be mated with any of said second mating portions such that a position of said at least one of said straps may be adjusted by changing the second mating portion to which the respective first mating portion is mated.

22. The head harness of claim 12 wherein at least one of said straps includes a first mating portion of a snap fastener, and said frame assembly includes a plurality of second mating portions of the snap fastener, said first mating portion of said at least one of said straps being configured to be mated with any of said second mating portions such that a position of said at least one of said straps may be adjusted by changing the second mating portion to which said first mating portion is mated, wherein said head harness optionally includes a chincup by mating said first mating portion with a second mating portion of a snap fastener included on said chincup as opposed to a second mating portion of said frame assembly.

23. The head harness of claim 1 wherein
a mounting assembly is coupled to said frame assembly for mounting a night vision device to said frame assembly,
said frame assembly being curved inward from a center portion towards two end portions such that when a user wears the head harness, the inwardly curved end portions extend toward a face of the user.

24. The head harness of claim 1 wherein said frame assembly is curved downward from said center member towards said end members.

25. A head harness for supporting a night vision device, said head harness comprising:
a frame assembly, and
a plurality of straps configured to be coupled to said frame assembly using snap fasteners, said straps being adjustable by a user of the head harness,
wherein said plurality of straps includes a vertical strap for extending over a user's head, an upper side strap configured to be coupled to two end portions of said frame assembly, and a lower side strap configured to be coupled to said two end portions of said frame assembly, and
a first mating portion of a snap fastener of at least one of said upper and said lower side straps are configured to be coupled to one of a plurality of second mating portions of the snap fastener on said frame assembly such that a position of said at least one of said upper and said lower side straps is adjustable.

26. A head harness for supporting a night vision device, said head harness comprising:
a frame assembly, and
a plurality of straps configured to be coupled to said frame assembly using snap fasteners, said straps being adjustable by a user of the head harness,
wherein at least one of said straps includes a first mating portion of a snap fastener, said frame assembly including a plurality of second mating portions of the snap fastener, said first mating portion being configured to be mated with any of said second mating portions such that a position of said at least one of said straps may be adjusted by changing the second mating portion to which the respective first mating portion is mated.

27. A head harness for supporting a night vision device, said head harness comprising:
a frame assembly, and
a plurality of straps configured to be coupled to said frame assembly using snap fasteners, said straps being adjustable by a user of the head harness,
wherein at least one of said straps includes a first mating portion of a snap fastener, and said frame assembly includes a plurality of second mating portions of the snap fastener, said first mating portion of said at least one of said straps being configured to be mated with any of said second mating portions such that a position of said at least one of said straps may be adjusted by changing the second mating portion to which said first mating portion is mated, wherein said head harness optionally includes a chincup by mating said first mating portion with a second mating portion of a snap fastener included on said chincup as opposed to a second mating portion of said frame assembly.

* * * * *